United States Patent
Davies et al.

(10) Patent No.: US 6,193,569 B1
(45) Date of Patent: Feb. 27, 2001

(54) WATER JET PROPULSION UNIT FOR USE IN WATER BORNE CRAFT

(76) Inventors: Richard Gwyn Davies, 15 Dundonald Street, Dunedin (NZ), 9001; Barry John Davies, 1 Scott Street, Tuatapere (NZ), 9655

( * ) Notice: Subject to any disclaimer, the term of this patent is extended or adjusted under 35 U.S.C. 154(b) by 0 days.

(21) Appl. No.: 09/147,769
(22) PCT Filed: Nov. 7, 1997
(86) PCT No.: PCT/NZ97/00153
  § 371 Date: Mar. 4, 1999
  § 102(e) Date: Mar. 4, 1999
(87) PCT Pub. No.: WO98/21090
  PCT Pub. Date: May 22, 1998

(30) Foreign Application Priority Data

Oct. 11, 1996 (NZ) .................................................. 299565

(51) Int. Cl.[7] .................................................. B63H 11/00
(52) U.S. Cl. .................................. 440/38; 440/75; 440/81
(58) Field of Search ................................ 440/38, 47, 57, 440/75, 81, 83, 80, 67; 60/221; 416/128, 129

(56) References Cited

U.S. PATENT DOCUMENTS

| | | | |
|---|---|---|---|
| 2,987,031 | * 6/1961 | Odden | 440/81 |
| 3,044,260 | 7/1962 | Hamilton | 60/35.54 |
| 3,082,732 | 3/1963 | Stallman | 115/16 |
| 3,849,982 | * 11/1974 | Hall | 440/67 |
| 4,074,652 | * 2/1978 | Jackson | 440/67 |
| 4,538,996 | 9/1985 | Inwood | 440/38 |
| 4,872,858 | 10/1989 | Hasegawa et al. | 440/38 |
| 4,887,982 | * 12/1989 | Newman et al. | 440/81 |
| 4,900,281 | * 2/1990 | McCormick | 440/78 |
| 5,256,090 | 10/1993 | Woolley | 440/40 |
| 5,536,187 | 7/1996 | Nanami . | |
| 5,618,213 | * 4/1997 | Nanami | 440/38 |
| 5,634,831 | * 6/1997 | Davies et al. | 440/47 |
| 5,658,176 | * 8/1997 | Jordan | 440/46 |
| 5,846,103 | * 12/1998 | Varney et al. | 440/38 |

FOREIGN PATENT DOCUMENTS

| | | | |
|---|---|---|---|
| 1203635 | * 10/1965 | (DE) | 440/38 |
| 3942672 | 7/1991 | (DE) . | |
| 1422618 | 1/1965 | (FR) . | |
| 84693 | * 5/1984 | (JP) | 440/67 |
| 160392 | * 7/1986 | (JP) | 440/81 |
| 213495 | * 9/1991 | (JP) | 440/47 |
| 123228 | 3/1959 | (NZ) . | |
| 148402 | 4/1967 | (NZ) . | |
| WO 94/08845 | * 4/1994 | (WO) | 440/38 |

OTHER PUBLICATIONS

The Jet Boat The Making of A New Zealand Legend, Anne and Les Bloxham, pp. 80, 229 and 14.
Patent Abstracts of Japan, M920, p. 12, JP 1-262290 A (Toshiba Corp.), Oct. 19, 1989.

* cited by examiner

Primary Examiner—S. Joseph Morano
Assistant Examiner—Ajay Vasudeva
(74) Attorney, Agent, or Firm—Jacobson, Price, Holman & Stern, PLLC

(57) ABSTRACT

A water jet propulsion unit suitable for use in outboard or stern-drive configuration in motor boats. The unit has an intake section, a pump section and a drive section within which is incorporated a pressure control device and nozzle. In the pump section there are two counter-rotating impellers on concentric counter-rotating shafts. The impellers are mounted upstream of the drive section. The drive section contains a drive transmission carrier to which is attached the pressure control device both being located in the vortex created in the water flow, downstream of the two impellers. The pressure control device allows the propulsion unit to operate in a low pressure high mass mode while maintaining pump priming. The impellers can be removed without disassembly of the drive transmission carrier.

14 Claims, 4 Drawing Sheets

FIG.3 SECTION A-A

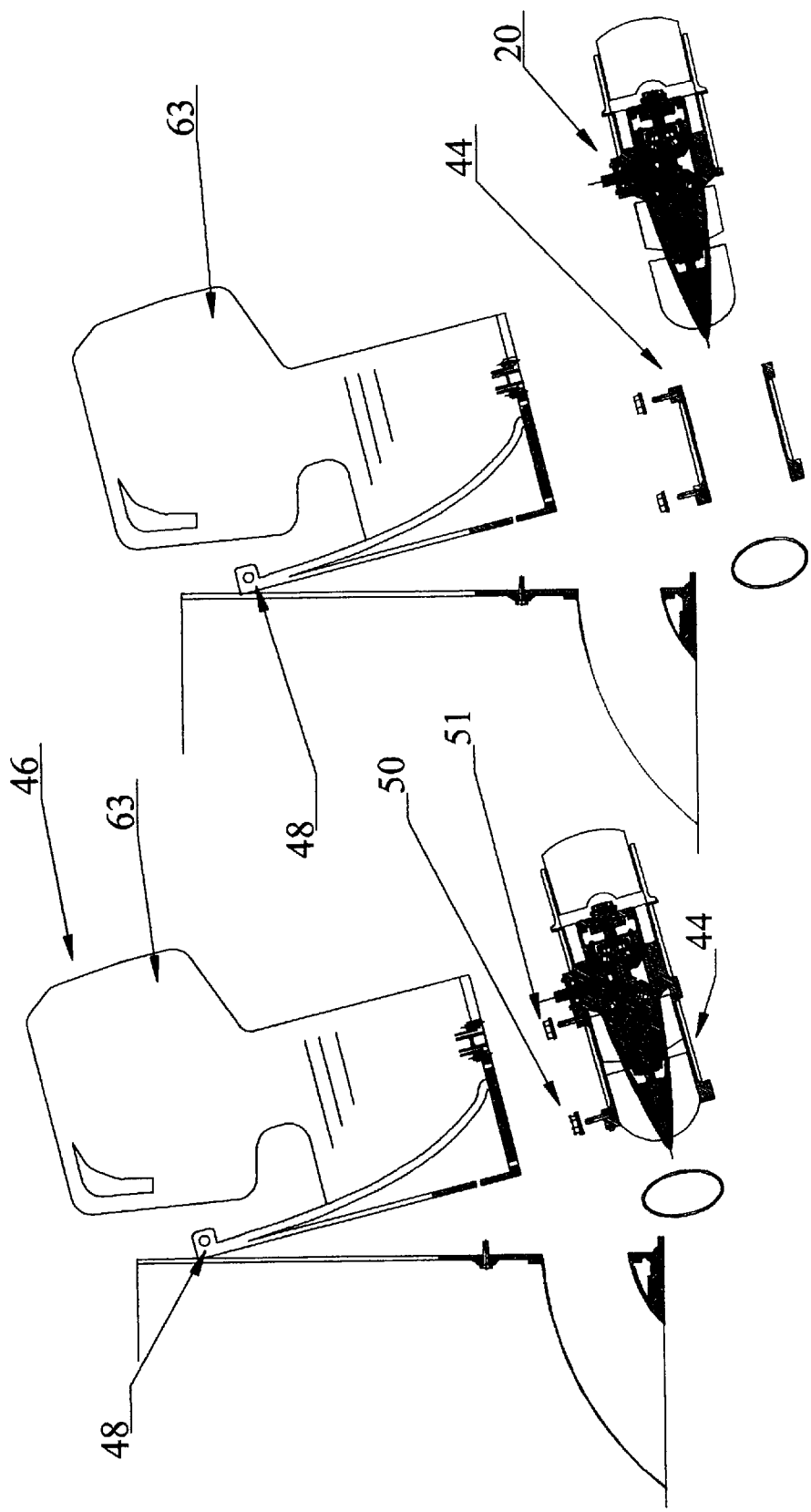

WATER JET PROPULSION UNIT FOR USE IN WATER BORNE CRAFT

TECHNICAL FIELD

The present invention relates to water jet propulsion units for use in water borne craft.

BACKGROUND OF THE INVENTION

This invention describes a water jet propulsion unit but more particularly a fuel efficient unit which may be used in what are commonly called outboard or stem-drive configurations in motor boats. The device utilises a pair of counter-rotating impellers and seeks to minimise internal frictional losses and the amount of kinetic energy imparted to the jet stream. It may also be described as an axial flow unit which achieves high efficiency gains by acting as a low pressure high mass device rather than a pressure inducing device.

The invention in general terms complies with the design and theoretical requirements described in our U.S. Pat. No. 5,634,831 but the constraints imposed by the desirability of a compact and lightweight outboard or stem-drive configuration introduces a set of parameters which do not apply to our previous designs. The device to be described is thus a low pressure mass transfer device according to our previous invention but with a drive transmission carrier and spring loaded pressure control device placed inside the flow vortex created downstream of the two counter-rotating impellers. In our previous designs the control devices are mounted to the perimeter walls of the nozzle sections. These control devices overcome the difficulties associated with the priming and pressure regulation of the low pressure high mass device so described.

The constraints previously mentioned relate particularly to the requirement to have a right angle drive whereby it is necessary to place a driving shaft across the flow path of the water passing through the inside of the housing of the propulsion unit. Where this shaft passes through the flow path it is critical that it presents a hydrodynamic profile to the impinging flow. The shaft is thus provided with an enclosing structure (vane) of the correct hydrodynamic shape. The section of the driving shaft which passes across the flow path must be of a minimal diameter in order to keep the support vane as narrow as possible and yet have sufficient strength to enable it to reliably accept the load from the driving engine. In this case the enclosing structure or vane is formed into the drive section and is also used to support the drive transmission carrier.

Because of the helical nature of the flow issuing from the upstream impeller it becomes critical, in order to maintain the efficiency of the unit, to also place support structures for the transmission drive carrier in the correct position. ie: the vanes must preferably be placed in an area of axial or linear flow. The reason for this is that any axially aligned structure placed in a helically moving flow is acted upon by the whirl component of that flow. This results in a substantial increase in the level of turbulence generated inside the unit and subsequent interference with the helically moving flow impinging on the downstream impeller. If axial flow is to be achieved at the nozzle outlet any disturbance of the flow on the downstream impeller must be avoided in order for the counter-rotation cancellation effect to remain fully functional. These support structures are also required to have the correct hydrodynamic shape in order to maintain the efficiency of the device. Strict attention to potential frictional losses is particularly important in a low pressure high mass device because through-pump flow velocities are significantly higher than in conventional high pressure statored designs absorbing the same horsepower.

Further, the efficiency of the unit is effected by the relative speed of the two impellers and so for the present invention the relative tip speed of the impellers must be kept in the range of about 0 to 65 meters per second. Impeller tip speed, gearing and engine speed must all be calibrated according to this basic parameter.

In achieving a light weight design which allows ease of disassembly for maintenance purposes the positioning of the impellers in relation to the other mechanical components is also important. The present invention allows this to be achieved without disassembly of the drive components, an important cost saving feature when propulsion units of this type are in routine commercial use. The primary reason for this being the need to maintain impeller clearances inside the pump housing within acceptable tolerances.

In order for the driving components, such as the gears and bearings, to be protected from dirt and other contaminants found in the marine environment, they must be enclosed in a lubricant filled water-tight casing.

A further important constraint is the limited space afforded for the positioning of bevel gears inside the drive transmission carrier whilst also maintaining an axial flow configuration. The specific limitation applies to the size of and therefore strength of the gears necessary for them to accept the input power required. In the case of the stern-drive configuration we largely overcome this by providing for a geared speed reduction in a right angle drive external to the drive transmission carrier as described in the drawings. A one to one ratio in the bevel gears in the drive transmission carrier itself thus makes it possible to maximise gear sizes and thus power input. Where size limitations in a very small construction adversely effects the overall design criteria, the pump casing walls may be diverged or coned slightly to provide sufficient space for the transmission carrier and its components. The shape of the impellers must be altered accordingly with due attention to their relative speed and performance. In this case the upstream impeller is slightly conical in shape, at its periphery, with the downstream impeller also being conical but with approximately one third of the trailing edge of its blades curving smoothly back to parallel with the axis of the unit and the pump casing walls.

Examples of prior art constructions may be seen by reference to the following; U.S. Pat. Nos. 3,082,732; 4,538996; and 4,872,858. In all of these devices the impeller is fixed to the vertically arranged shaft of a conventional outboard layout. Water is drawn through the intake and centrifugaly driven around a horizontally arranged bowl shaped pump housing thence through a nozzle. The numerous directional changes and high pressure design limitations mean these devices allow high fuel consumption and are generally less efficient than both conventional inboard axial flow designs and propellered outboards. A further prior art construction being New Zealand 148,402 shows a pair of axial impellers with stators in the nozzle section as described in New Zealand Patent Specification 123,228. In DE 39 42 672 Al are described several devices containing counter-rotating impellers two of which may be used in outboard configuration where the input shaft passes through the flow inside the pump casing. The propulsion units described are of mixed flow design which the specification states is necessary because the increased diameter of a mixed flow impeller design over that of an axial design enables a drive transmission to be placed within two adjacent impeller hubs.

A number of fundamental design flaws mean that these devices can never be efficient. The reasons for this are as follows;

(i) None can function as a low pressure high mass device as described in our U.S. Pat. No. 5,634,831.

(ii) In the outboard designs described, the insertion of a drive shaft across the flow path, between the two impellers, in a helically moving flow causes unacceptable losses.

(iii) The shape of the downstream impeller in all of the designs conforms to the shape of the nozzle portion of the pump housing, being tapered or frusto conical in shape, where straightening vanes would normally be placed in a conventional design. This part of the design is seriously flawed in that as water passes into the reduced nozzle area it wants to accelerate. However because the impeller blades (which are in the nozzle) are progressively reducing in diameter, along the impeller hub, this means that the circumferential velocity of the impeller tips is also reducing. As a result the amount of kinetic energy imparted to the flow by the blades is also decreasing towards the downstream end of the impeller. The consequence of this is that the impeller blades try to slow the water down while the water itself wants to accelerate. This causes further losses in the overall efficiency of these devices.

(iv) The exposure of the transmission driving components to the harsh conditions found in the marine environment makes this design unsuited for commercial use.

(v) The insertion of a drive shaft between the impellers means that the increased separation distance between the impellers increases in-pump frictional losses due to the fact that the flow between the impellers is helical in motion. Ideally the impellers should be in closest proximity to each other in order to reduce the losses resulting from the water helically spinning inside the pump casing.

(vi) Between impeller insertion of the input shaft increases the complexity of the design in respect of maintenance.

The typical outboard-jet powered motor boat has a high fuel consumption. The primary reasons for this are that outboard jets currently in use do not conform well to propulsion theory in respect of kinetic energy losses to the jet stream and they have high internal frictional losses which arise from poor attention to the design and placement of internal pump structures.

OBJECTS OF THE INVENTION

It is therefore the principle object of the present invention to provide an improved fuel efficient and compact water jet propulsion unit which can be used in either an outboard or stern-drive configuration.

The objectives and advantages of the present invention are accomplished by ensuring that the unit operates in close accordance with propulsion theory i.e. that the unit operates as a low pressure high mass device and that the design minimises internal frictional losses by correct placement and design of the impellers and support vanes.

In addition, an upstream impeller is of a mixed flow configuration and a downstream impeller is of an axial flow configuration. Also a ratio of a nozzle outlet area to that of a swept area of a forward impeller is about 0.55 to 1.

The general design requirements are achieved by forwardly mounting the impellers upstream of the drive transmission carrier. The importance of this arrangement being (i) achieving minimal distance between the impellers (ii) correct placement of a support vane for through-flow placement of the in-put shaft in an area of axial flow (iii) the ability to place the pressure control device and drive transmission carrier inside the vortex created by the two impellers and (iv) ease of maintenance.

These and other objects and advantages and novel features of the invention will become apparent from the following detailed description of the invention when considered in conjunction with the following drawings herein.

BRIEF DESCRIPTION OF THE DRAWINGS

FIG. 3 is a cross section at A—A of the upper support vane in plan view.

FIG. 7 is a side sectional elevation of the outboard version of the jet propulsion unit showing how the pump and drive sections can be separated from the engine.

FIG. 8 is a side sectional elevation of the outboard version of the jet propulsion unit showing how the drive section can be separated from the pump and intake sections.

DESCRIPTION OF THE PREFERRED EMBODIMENTS

Figure 1:
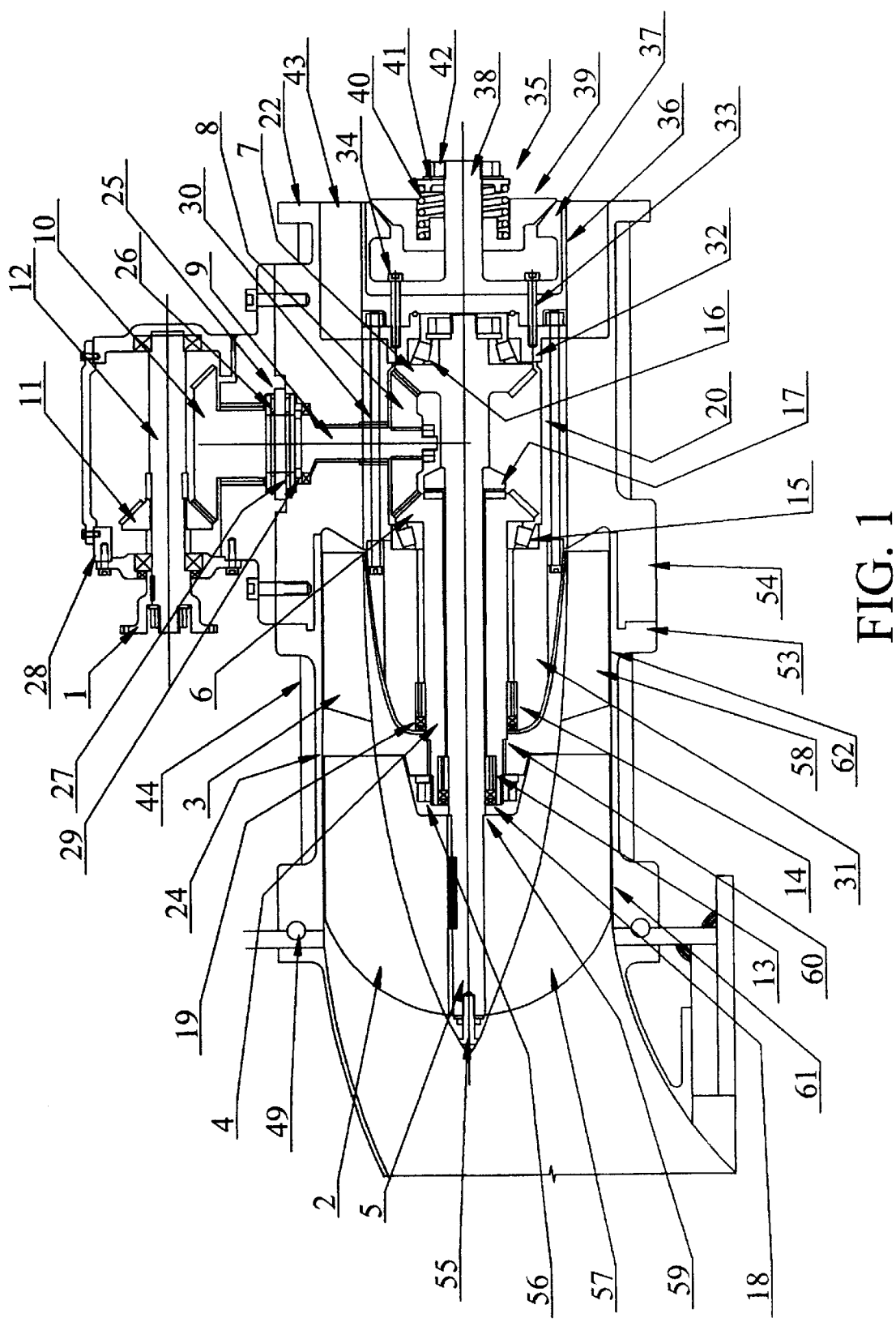
FIG. 1 is a side sectional elevation of the stem-drive version of the jet propulsion unit showing the intake section in part view only.

FIG. 1 describes a stern drive configuration of an axial flow water jet propulsion unit where an engine (not shown) may be coupled directly to the drive flange 1. Counter-rotating impellers 2 and 3 are fixed to separate concentric shafts 4 and 5 which in turn have spiral bevel gears 6 and 7 fixed to their ends. These spiral bevel gears 6 and 7 mesh jointly with the spiral bevel drive gear 8 which is fixed to the vertical shaft 9. Vertical shaft 9 has a spiral bevel gear 10 fixed to its end which is in turn driven by spiral bevel gear 11. Spiral bevel gear 11 is fixed to the prime input shaft 12 to which is connected the drive flange 1. The spiral bevel gears 6 and 7 and the concentric shafts 4 and 5 to which they are mounted are supported by needle roller bearings 13 and 14 and by tapered roller bearings 15 and 16. Thrust from impeller 2 imposed on inner concentric shaft 5 is transferred from the downstream spiral bevel gear 7, which is connected to concentric shaft 5, to the inner face of spiral bevel gear 6 through an axial cylindrical roller bearing 17. The thrust generated by the downstream impeller 3 fixed to the outer concentric shaft 4 is transferred to the tapered roller bearing 15. All the thrust generated by the impellers 2 and 3 for propulsion is thus transferred to the tapered roller bearing 15. Seals 18 and 19 serve to exclude water from the oil filled drive transmission carrier 20. The vertical shaft 9 passes through the centre of the support vane 21, FIG. 3, which joins the drive transmission carrier 20 to the outer housing of the drive section 22. A similar vane 23 located on the opposite side of the drive transmission carrier 20 provides additional locational support for the drive transmission carrier 20. These vanes 21 and 23 provide rigid support for the drive transmission carrier 20 and enable the thrust developed by the impellers 2 and 3 to be transferred to the pump housing 24. Both vanes 21 and 23 are hydrodynamically shaped in order to allow a smooth transition of flow through this portion of the jet propulsion unit and around the vertical shaft 9. Typically the vanes 21 and 23 have a length to width ratio of about four to one (4:1). The length of the vanes 21 and 23 may be greater but this increases the overall length of the jet propulsion unit making it less compact.

Thrust imposed on the vertical shaft 9 is taken by the bearing washer 25 and needle rollers 26 and 27, the bearing washer 25 being sandwiched between the drive transmission carrier 20 and the base of the drive input housing 28. The vertical shaft 9 is located by circlip 29.

For ease of assembly and maintenance, access to the drive transmission carrier 20 for insertion of spiral bevel gears 6,7 and 8 and bearings 15,16,17 and 30 is achieved by providing a removable cone shaped bearing carrier 31 at the upstream end of the drive transmission carrier 20 and a cover plate 32 at the downstream end.

Figures 2, 4:
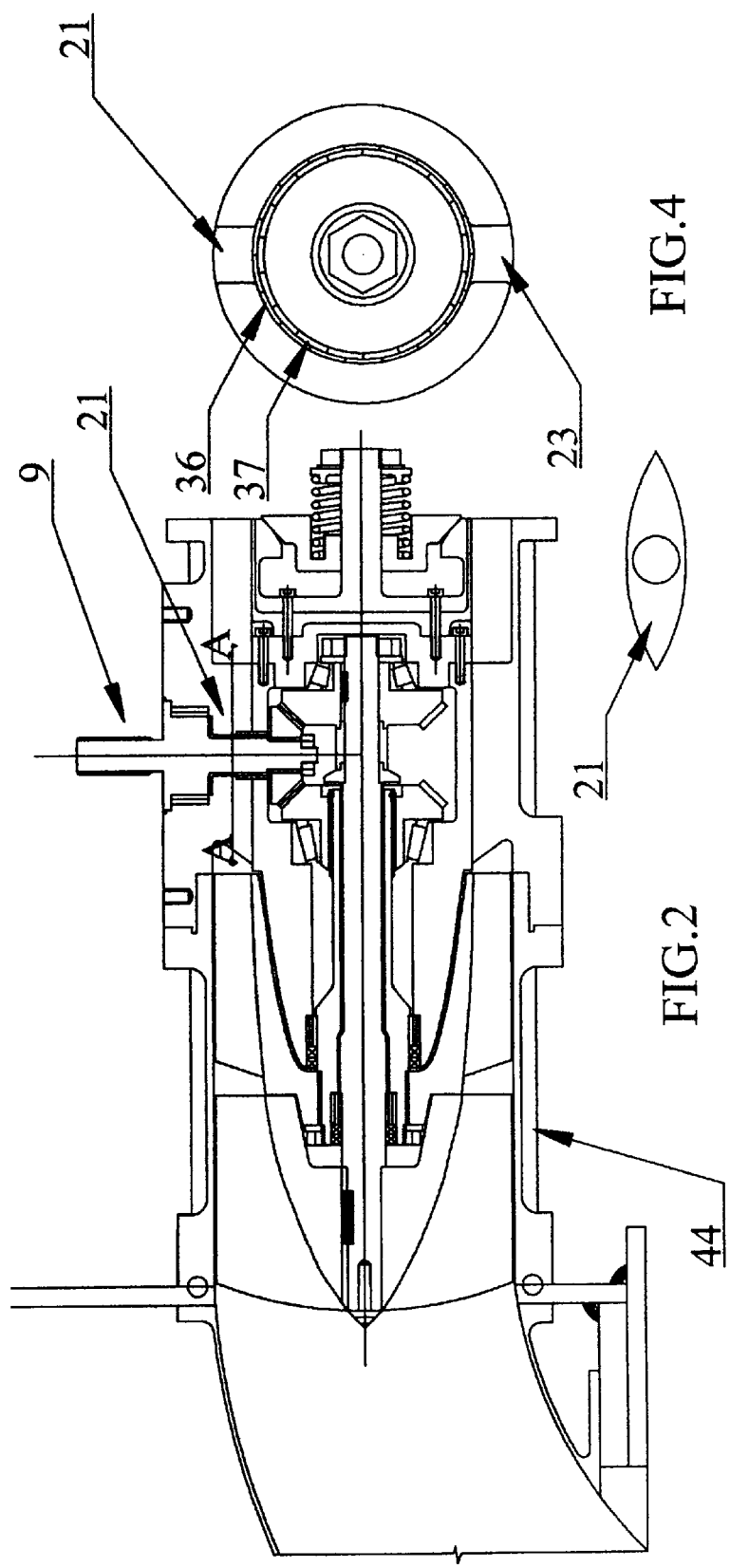
FIG. 2 is a side sectional elevation of the outboard version of the jet propulsion unit showing the intake section in part view only.
FIG. 4 is an end elevation of the pressure control device showing the circular arrangement of the over-lapping crown of flaps.

The end cover plate 32 is fixed to the rear of the drive transmission carrier 20 by bolts 33 and 34. A pressure control device 35 is also fixed to the rear of the drive transmission carrier 20. The pressure control device 35 consists of an outer segmented ring or crown of flaps 36 in close alignment, within which is found a further segmented ring or crown of flaps 37, also in close alignment. The two sets of flaps 36 and 37 evenly overlap one another so that when they expand they jointly provide a continuous surface to the approaching water flow. FIG. 4 shows an end view which indicates the manner in which the flaps 36 and 37 are arranged in respect to each other. A centrally mounted shaft 38 formed as part of the inner flap set 37 provides location for a tapered and circular plunger cone 39 which is able to move up and down the shaft 38. FIGS. 1, 2 and 4 show the two sets of flaps 36 and 37 in the fully retracted position. A spring 40, retained by the seat 41 and nut 42 provides a means of tensioning the plunger cone 39 which in turn moves down the shaft 38 thereby pushing out both sets of flaps 36 and 37 so that they reduce the effective outlet area of the nozzle 43. Under low flow conditions, at start-up, this thus enables the unit to prime and also retain low pressure high mass conditions as the impellers 2 and 3 speed up. As the pressure increases the flaps 36 and 37 of the pressure control device 35 automatically close inwards allowing the outlet area of the nozzle 43 to increase, thereby maintaining a constantly reduced pressure regime within the jet propulsion unit and therefore a high mass transfer rate. The spring 40 provides sufficient tension for back pressure conditions within the unit to be retained so that the impellers 2 and 3 remain loaded at start-up and in the acceleration phase. The pressure control device 35 thus provides a constantly variable means of instantaneously controlling the internal pressure of the unit in both the acceleration and deceleration phase whilst also allowing priming to occur.

FIG. 2 shows a substantially similar jet propulsion device but with the drive input housing removed allowing the vertical shaft 9 to be coupled directly to an engine 63 in a typical outboard configuration.

FIGS. 5 to 8 show the manner in which an engine may be attached vertically to the shaft 9 in outboard configuration.

Figure 6:
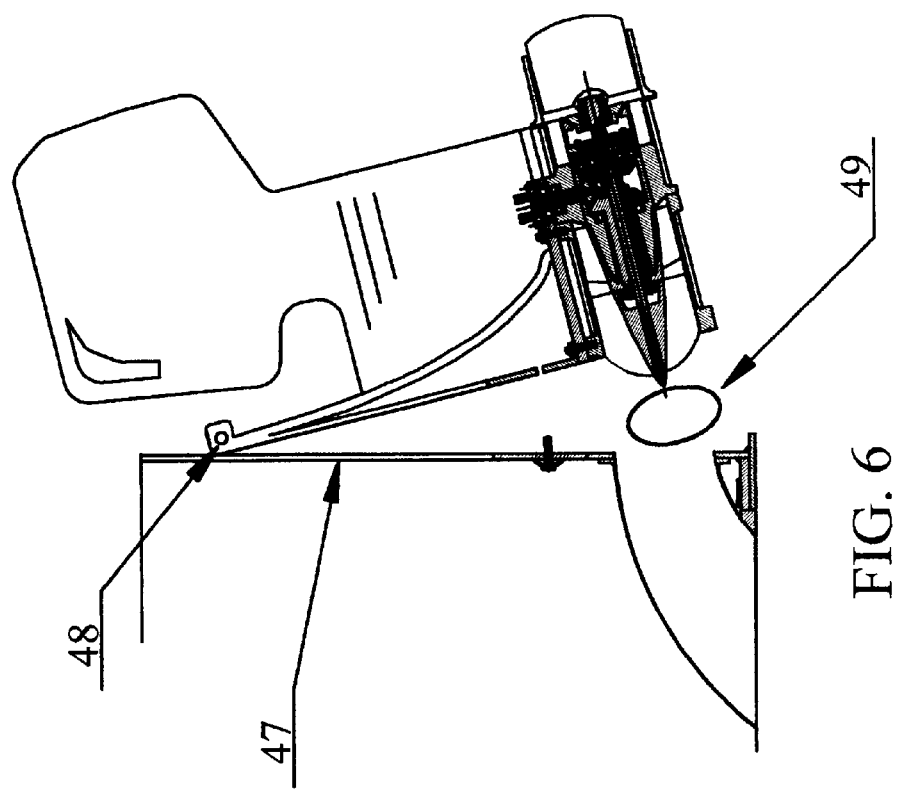
FIG. 6 is a side sectional elevation of the outboard version of the jet propulsion unit showing how the pump and drive sections can swing away from the intake section.
Figure 5:
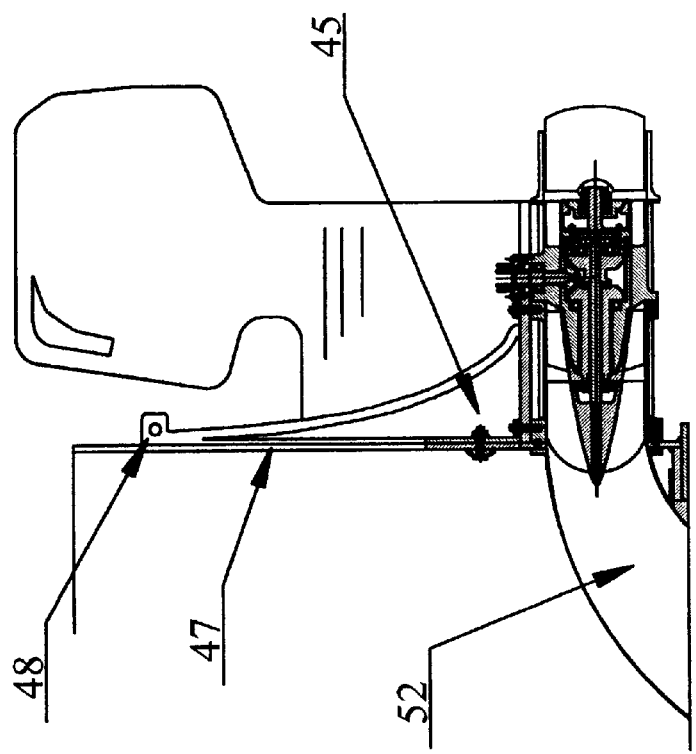
FIG. 5 is a side sectional elevation of the outboard version of the jet propulsion unit.

Detachment of the pump section 44 is achieved by first of all removing the nut(s) 45 which in turn permits the entire outboard unit 46 to be swiveled back away from the transom 47 as shown in FIGS. 5 and 6. A hinge point 48 seen in FIGS. 5 to 8 allows this to be achieved and the O ring seal 49 shown in FIGS. 5 to 8 can be removed. Removal of nuts 50 and 51 then allows the entire pump section 44, less intake section 52, to be removed as shown in FIG. 7. Disassembly of the pump section 44 can then be accomplished by removing the pump housing flange 53 and drive transmission carrier flange 54 fixing bolts and nuts (not shown), permitting the withdrawal of the impellers 2 and 3 and drive transmission carrier 20, as a single assembly from the pump housing 24, as shown in FIG. 8. The impellers 2 and 3 can then be removed by unscrewing the retaining screw 55 and the retaining nut 56, both seen in FIG. 1. The inner wall of the pump housing 24 is slightly tapered so that the impeller blades 57 and 58 which have matching tapers, are able to be moved forward progressively as they wear so that the correct clearances are maintained. This is accomplished by placing spacer washers (not shown) behind the impeller seats 59 and 60. This thus greatly increases the useful life of the impellers 2 and 3 before build up of the impeller tips 61 and 62 is required. The impeller blades 57 and 58 typically have blade angles in the range of about 30 to 40 degrees in order to maximise the flow rate needed for efficient thrust out-put. Further improvements arise by ensuring that the blades 57 and 58 are of thinnest practicable section and have an aerofoiled profile.

What is claimed is:

1. A water jet propulsion unit comprising:

an intake section; an axial flow pump section; a drive section, all in smooth communication with one another; said drive section containing a drive transmission carrier and pressure control device; said pressure control device being mounted on said drive transmission carrier, downstream of said drive transmission carrier; said drive transmission carrier consisting of a removable upstream mounted cone shaped bearing carrier, gears and downstream mounted cover plate; said pump section containing a single pair of counter-rotating axial flow impellers; said impellers being each mounted on separate concentric counter-rotating shafts extending forwardly from said drive transmission carrier; said drive transmission carrier being located in said drive section by hydrodynamically shaped support vanes downstream of said axial flow impellers; one of said support vanes having a vertically aligned hole to permit a vertically aligned input drive shaft to connect to said drive transmission carrier; said drive section being detachable from said pump section and said intake section; said pressure control device permitting the unit to operate in a low pressure high mass mode; said impellers being removable without disassembly of said drive section; said propulsion unit being mountable in either a stern-drive or outboard configuration.

2. The propulsion unit as claimed in claim 1 where there are no support structures forward or between the two impellers.

3. The propulsion unit as claimed in claim 1 where the impellers are mounted upstream of the drive section.

4. The propulsion unit as claimed in claim 1 where the coaxial drive shafts extend upstream from said gears in said drive transmission section.

5. The propulsion unit as claimed in claim 1 which is used in a stern-drive configuration.

6. The propulsion unit as claimed in claim 1, which is used in an outboard configuration.

7. The propulsion device a claimed in claim 1 where the ratio of the nozzle outlet area to that of the swept area of the forward impeller being about 0.55 to 1.

8. A water jet propulsion unit comprising:

an intake section; an axial flow pump section; a drive section, all in smooth communication with one another; said drive section containing a drive transmission carrier and pressure control device; said pressure control device being mounted on said drive transmission carrier, downstream of said drive transmission carrier; said drive transmission carrier consisting of a removable upstream mounted cone shaped bearing carrier, gears and downstream mounted cover plate; said pump section containing a single pair of counter-rotating axial flow impellers; said impellers being each mounted on separate concentric counter-rotating shafts extending forwardly from said drive transmission carrier, said drive transmission carrier being located in said drive section by hydrodynamically shaped support vanes downstream of said axial flow impellers; one of said support vanes having a vertically aligned hole to permit a vertically aligned input drive shaft to connect to said drive transmission carrier; said drive section being detachable from said pump section and said intake section; said pressure control device permitting the unit to operate in a low pressure high mass mode; said impellers being removable without disassembly of said drive section; said propulsion unit being mountable in either a stern-drive or outboard configuration, the drive transmission carrier and the pressure control device being mounted in a vortex created in the water flow by the two impellers.

9. A water jet propulsion unit comprising:

an intake section; an axial flow pump section; a drive section, all in smooth communication with one another; said drive section containing a drive transmission carrier and pressure control device; said pressure control device being mounted on said drive transmission carrier, downstream of said drive transmission carrier; said drive transmission carrier consisting of a removable upstream mounted cone shaped bearing carrier, gears and downstream mounted cover plate; said pump section containing a single pair of counter-rotating axial flow impellers; said impellers being each mounted on separate concentric counter-rotating shafts extending forwardly from said drive transmission carrier, said drive transmission carrier being located in said drive section by hydrodynamically shaped support vanes downstream of said axial flow impellers; one of said support vanes having a vertically aligned hole to permit a vertically aligned input drive shaft to connect to said drive transmission carrier; said drive section being detachable from said pump section and said intake section; said pressure control device permitting the unit to operate in a low pressure high mass mode; said impellers being removable without disassembly of said drive section; said propulsion unit being mountable in either a stern-drive or outboard configuration, the one support vane for the drive transmission carrier having a length to width ratio of about 4 to 1.

10. A water jet propulsion unit comprising:

an intake section; an axial flow pump section; a drive section, all in smooth communication with one another; said drive section containing a drive transmission carrier and pressure control device; said pressure control device being mounted on said drive transmission carrier, downstream of said drive transmission carrier; said drive transmission carrier consisting of a removable upstream mounted cone shaped bearing carrier, gears and downstream mounted cover plate; said pump section containing a single pair of counter-rotating axial flow impellers; said impellers being each mounted on separate concentric counter-rotating shafts extending forwardly from said drive transmission carrier, said drive transmission carrier being located in said drive section by hydrodynamically shaped support vanes downstream of said axial flow impellers; one of said support vanes having a vertically aligned hole to permit a vertically aligned input drive shaft to connect to said drive transmission carrier; said drive section being detachable from said pump section and said intake section; said pressure control device permitting the unit to operate in a low pressure high mass mode; said impellers being removable without disassembly of said drive section; said propulsion unit being mountable in either a stern-drive or outboard configuration, the tip speed between the two axial flow impellers being set in the range of about 0 to 65 meters per second.

11. A water jet propulsion unit comprising:

an intake section; an axial flow pump section; a drive section, all in smooth communication with one another; said drive section containing a drive transmission carrier and pressure control device; said pressure control device being mounted on said drive transmission carrier, downstream of said drive transmission carrier; said drive transmission carrier consisting of a removable upstream mounted cone shaped bearing carrier, gears and downstream mounted cover plate; said pump section containing a single pair of counter-rotating axial flow impellers; said impellers being each mounted on separate concentric counter-rotating shafts extending forwardly from said drive transmission carrier, said drive transmission carrier being located in said drive section by hydrodynamically shaped support vanes downstream of said axial flow impellers; one of said support vanes having a vertically aligned hole to permit a vertically aligned input drive shaft to connect to said drive transmission carrier; said drive section being detachable from said pump section and said intake section; said pressure control device permitting the unit to operate in a low pressure high mass mode; said impellers being removable without disassembly of said drive section; said propulsion unit being mountable in either a stern-drive or outboard configuration, said axial flow impellers having peripheral blade angles in the range of about 30 to 40 degrees.

12. A water jet propulsion unit comprising:

an intake section; an axial flow pump section; a drive section, all in smooth communication with one another; said drive section containing a drive transmission carrier and pressure control device; said pressure control device being mounted on said drive transmission carrier, downstream of said drive transmission carrier; said drive transmission carrier consisting of a removable upstream mounted cone shaped bearing carrier, gears and downstream mounted cover plate; said pump section containing a single pair of counter-rotating axial flow impellers; said impellers being each mounted on separate concentric counter-rotating shafts extending forwardly from said drive transmission carrier, said drive transmission carrier being located in said drive section by hydrodynamically shaped support vanes downstream of said axial flow impellers; one of said support vanes having a vertically aligned hole to permit a vertically aligned input drive shaft to connect to said drive transmission carrier; said drive section being detachable from said pump section and said intake section; said pressure control device permitting the unit to operate in a low pressure high mass mode; said impellers being removable without disassembly of said drive section; said propulsion unit being mountable in either a stern-drive or outboard configuration, said pressure control device comprises two layers of overlapping flaps in circular arrangement being tensioned by a cone and spring.

13. A water jet propulsion unit comprising:

an intake section; an axial flow pump section; a drive section, all in smooth communication with one another; said drive section containing a drive transmission carrier and pressure control device; said pressure control device being mounted on said drive transmission carrier, downstream of said drive transmission carrier, said drive transmission carrier consisting of a removable upstream mounted cone shaped bearing carrier, gears and downstream mounted cover plate; said pump section containing a single pair of counter-rotating axial and mixed flow impellers; an upstream one of said pair of impellers being of said mixed flow configuration and a downstream one of said pair of impellers being of said axial flow configuration; said impellers being each mounted on separate concentric counter-rotating shafts extending forwardly from said drive transmission carrier; said drive transmission carrier being located in said drive section by hydrodynamically shaped support vanes downstream of said axial flow impellers; one of said support vanes having a vertically aligned hole to permit a vertically aligned input drive shaft to connect to said drive transmission carrier; said drive section being detachable from said pump section and said intake section; said pressure control device permitting the unit to operate in a low pressure high mass mode; said impellers being removable without disassembly of said drive section; said propulsion unit being mountable in either a stern-drive or outboard configuration.

14. A water jet propulsion unit comprising:

an intake section; an axial flow pump section; a drive section, all in smooth communication with one another; said drive section containing a drive transmission carrier and pressure control device; said pressure control device being mounted on said drive transmission carrier, downstream of said drive transmission carrier; said drive transmission carrier consisting of a removable upstream mounted cone shaped bearing carrier, gears and downstream mounted cover plate; said pump section containing a single pair of counter-rotating axial flow impellers; said impellers being each mounted on separate concentric counter-rotating shafts extending forwardly from said drive transmission carrier, said drive transmission carrier being located in said drive section by hydrodynamically shaped support vanes downstream of said axial flow impellers; one of said support vanes having a vertically aligned hole to permit a vertically aligned input drive shaft to connect to said drive transmission carrier; said drive section being detachable from said pump section and said intake section; said pressure control device permitting the unit to operate in a low pressure high mass mode; said impellers being removable without disassembly of said drive section; said propulsion unit being mountable in either a stern-drive or outboard configuration, the drive section and pump housing being swivelled away from the intake section.

* * * * *